US012715525B2

(12) United States Patent

Borkholder

(10) Patent No.: US 12,715,525 B2
(45) Date of Patent: Aug. 25, 2026

(54) CONVERTIBLE GOOSENECK AND FIFTH WHEEL HITCH

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 322 days.

(21) Appl. No.: 18/610,550

(22) Filed: Mar. 20, 2024

(65) Prior Publication Data

US 2025/0296642 A1 Sep. 25, 2025

(51) Int. Cl.
*B62D 53/08* (2006.01)

(52) U.S. Cl.
CPC ..... *B62D 53/0842* (2013.01); *B62D 53/0807* (2013.01); *B62D 53/0857* (2013.01)

(58) Field of Classification Search
CPC ............ B62D 53/0842; B62D 53/0807; B62D 53/0857
See application file for complete search history.

(56) References Cited

U.S. PATENT DOCUMENTS

| | | | | |
|---|---|---|---|---|
| 5,513,869 A * | 5/1996 | Putnam | B62D 53/0828 280/901 |
| 6,485,045 B1 * | 11/2002 | King | B62D 53/0821 280/441 |
| 7,673,895 B1 * | 3/2010 | Hesse | B62D 53/061 280/441.1 |
| 7,753,392 B2 * | 7/2010 | Warnock | B62D 53/0814 280/438.1 |
| 10,322,612 B2 * | 6/2019 | McCoy | B62D 53/08 |
| 2003/0209879 A1 | 11/2003 | Lindenman et al. | |
| 2013/0307248 A1 * | 11/2013 | McCoy | B60D 1/488 280/495 |

* cited by examiner

*Primary Examiner* — Jacob D Knutson
(74) *Attorney, Agent, or Firm* — Sanders Pianowski LLP

(57) ABSTRACT

A convertible towing coupler is designed to attach to a towing vehicle using either a bed-mounted rail system or puck system. The convertible towing coupler can switch between a gooseneck attachment and a fifth wheel/kingpin attachment without having to remove the fifth wheel. The coupler includes a gooseneck frame with a gooseneck ball and fixed rails on either side of the gooseneck ball and a fifth wheel frame that is supported by the fixed rails. The fifth wheel frame can be secured to the gooseneck frame in a first position where it at least partially blocks the gooseneck ball and a second position where the gooseneck ball is useable. If the convertible coupler is used with a puck system, a puck-to-rail frame is attached to the towing vehicle and the gooseneck frame is affixed to the puck-to-rail frame.

19 Claims, 9 Drawing Sheets

144
160
134
140
142
150
158
158
146
134
148
152
24
158
122
124
126
120
76
70
126
72
124
126
80
124
82
22
126
83
86
124
78
20
44
32
52
49
38
44
34
40
50
48
46
40
42
41
40
42
36
42
44
30
44
42

24
142
148
152
156
160
134
144
140
146
150
154
120
130
78
110
132
128
112
100
70
76
86
84
82
96
98
72
74
122
80
20
41
44
30
22

122 124 126 120 76 70 126 72 124 80 82 86 124 126 83 22 124 78 126

20′ 32′ 41′ 40′ 40′ 41′ 40′ 40′ 42′ 30′ 42′

CONVERTIBLE GOOSENECK AND FIFTH WHEEL HITCH

BACKGROUND OF THE INVENTION

The present disclosure relates to towing receivers and connections. For medium to heavy-duty trailer towing, most vehicles use a connection located over the towing vehicle's axle. There are two main types of connections: fifth wheel and gooseneck. With a fifth wheel, the trailer has a pin that extends downwardly and the towing vehicle has a fifth wheel coupler that has a plate and jaws that mate with the pin. With a gooseneck, the trailer has a vertical coupler that extends downwardly with a coupler at the end and the towing vehicle has a ball that mates with the coupler. Both fifth wheel and gooseneck systems are attached to the towing vehicle through an existing rail system or puck system that is secured to the towing vehicle's frame. For users that have both types of trailers, they are forced to either switch out the coupler in the towing vehicle each time they switch trailers or purchase an adapter so both have the same coupling setup. Therefore, an improved device is needed that allows the user to switch between coupling setups without the need for adapters or moving heavy parts to or from the towing vehicle.

SUMMARY OF THE INVENTION

The present disclosure describes a convertible towing coupler for being affixed to a bed of a towing vehicle, the towing vehicle has fore and aft rails affixed thereto, either directly or through an optional puck-to-rail frame. The coupler comprises a gooseneck frame, a fifth wheel frame, and the optional puck-to-rail frame. The gooseneck frame has a gooseneck ball affixed thereto and is configured to be affixed to the fore and aft rails of the towing vehicle and supported thereby at corners of the gooseneck frame. A portion of the gooseneck frame that is adjacent the gooseneck ball is for contacting the aft rail to support the weight of a gooseneck trailer. The fifth wheel frame has a kingpin receiver and is mated to the gooseneck frame. The fifth wheel frame is moveable between a gooseneck position and a fifth wheel position, with the gooseneck position being defined by the fifth wheel frame affixed to the gooseneck frame with the kingpin receiver clear of the gooseneck ball. The fifth wheel position is defined by the fifth wheel frame affixed to the gooseneck frame with the kingpin receiver obstructing at least a portion of the gooseneck ball. When the kingpin receiver is clear of the gooseneck ball, a gooseneck trailer can be coupled. When the kingpin receiver at least partially obstructs the gooseneck ball, a kingpin trailer can be coupled.

For the optional puck-to-rail frame, the fore and aft rails are affixed to the puck-to-rail frame. The puck-to-rail frame has rotatable locks for mating with pucks located on the towing vehicle. The fore rail is affixed to the aft rail with a left side and a right side to form a perimeter frame. When the puck-to-rail frame is affixed to the vehicle, the fore and aft rails of the puck-to-rail frame are affixed to the vehicle.

DESCRIPTION OF THE PREFERRED EMBODIMENT

Figure 1:
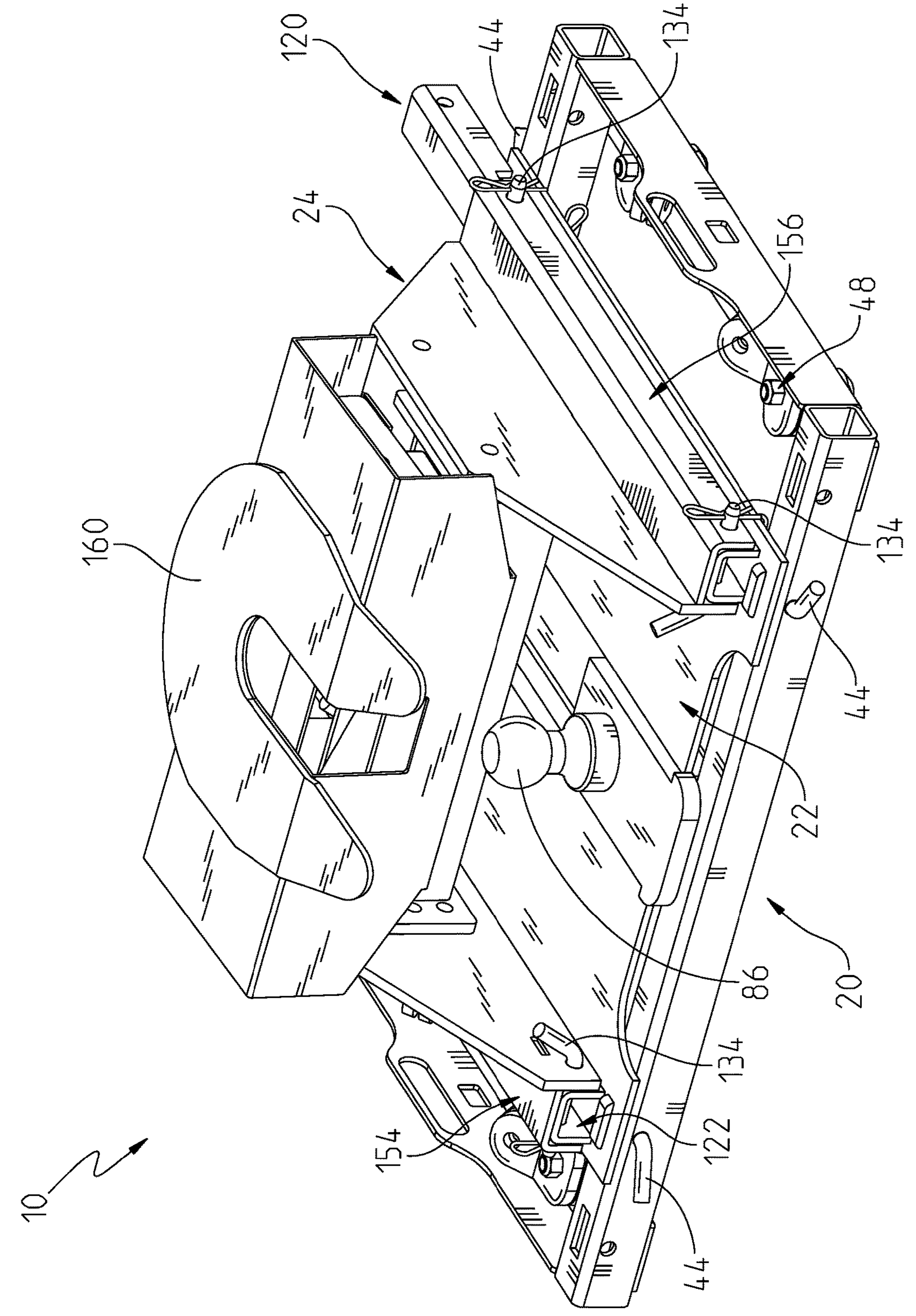
FIG. 1 is a top isometric view of a hitch adapter in the fifth wheel position.
Figure 2:
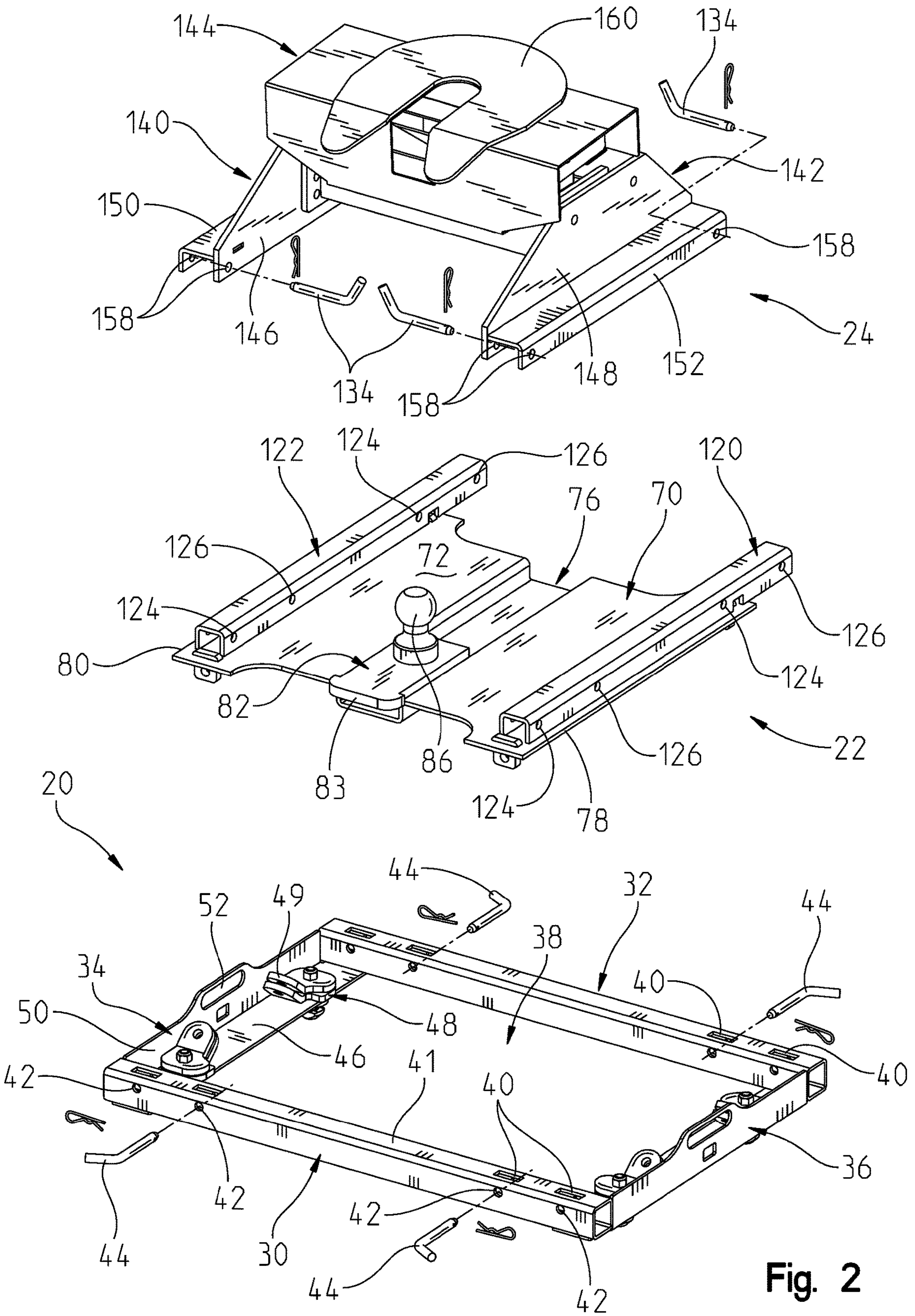
FIG. 2 is a partially exploded top isometric view of the hitch adapter in FIG. 1.

A convertible hitch adapter 10 is shown in FIG. 1 that is designed to be affixed to the bed of a towing vehicle (not shown). The bed as described herein includes a standard pickup truck bed or flatbed, or other platform that is secured to the chassis or frame rails of the vehicle and is located over a rear axle. As shown in FIG. 2, the hitch adapter 10 comprises three main components: a puck-to-rail frame 20, a gooseneck frame 22, and a fifth wheel frame 24. If the towing vehicle uses a puck system, all three frames are needed but if the towing vehicle has existing rails 20', the puck-to-rail frame 20 is not necessary. For clarity, if present, the existing rails 20' described as being affixed to the towing vehicle are typically located over the rear axle and use industry standard spacing and apertures.

The puck-to-rail frame 20 has an aft rail 30 and a fore rail 32 that are joined to a left side 34 and a right side 36 to form a perimeter with a central opening 38. The fore and aft rails 32, 30 are formed from square hollow tubing and have tab apertures 40 that extend through a top wall 41. Lock pin apertures 42 extend through vertical walls on either side of each tab aperture 40 and can receive hitch pins 44. The left side 34 has a bottom wall 46 that holds puck locks 48 and a side wall 50 that has an oval aperture 52 that operates as a lifting handle. The right side 36 has the same construction as the left side 34 with a bottom wall with puck locks 48 and a side wall with an oval aperture. The puck locks 48 are rotatable between an unlocked position and a locked position with the operation of a handle 49. When mated to pucks on the towing vehicle, moving the puck locks 48 to the locked position secures the puck-to-rail frame 20 to the towing vehicle. When rotated to the unlocked position, the puck-to-rail frame 20 can be separated from the towing vehicle.

Figure 3:
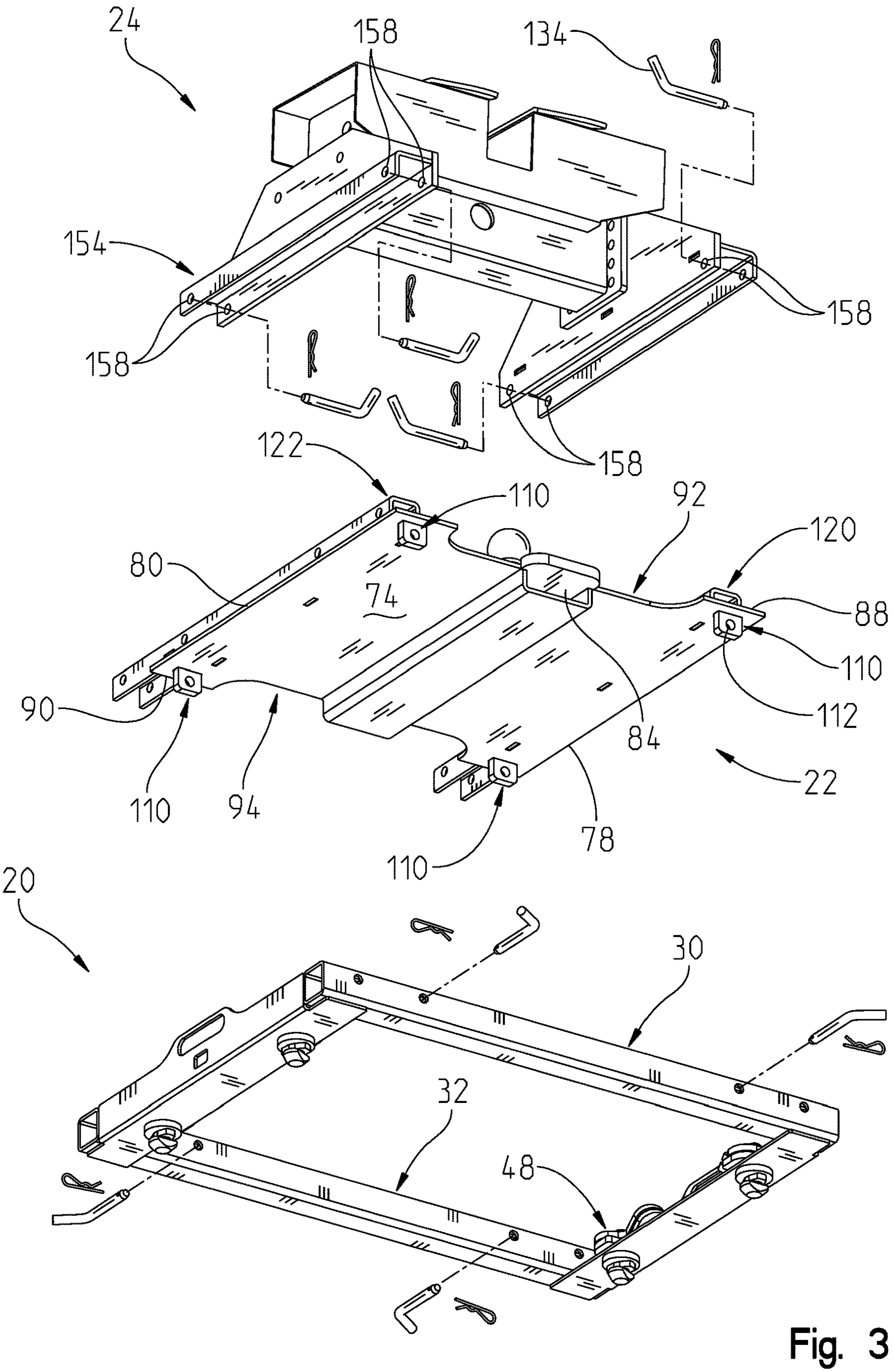
FIG. 3 is a partially exploded bottom isometric view of the of the hitch adapter in FIG. 1.

The gooseneck frame 22 is shown separated from the other frames 20, 24 in FIGS. 2-3 having a base plate 70. The base plate 70 has an upper surface 72 and an oppositely located lower surface 74 to define a thickness. The base plate 70 has a center channel 76 that is located at a midpoint between lateral edges 78, 80. Aft and fore transverse edge 88, 90 meet lateral edges 78, 80 at corners to define a perimeter profile. The aft and fore transverse edges 88, 90 each have a corresponding aft and fore recess 92, 94 that extends inwardly, making the center channel 76 shorter than the distance between the transverse edges 88, 90. Affixed to the center channel 76 is a ball mount plate 82 that has a lower surface 84 that is coplanar with lower surface 74. The ball mount plate 82 has a tongue portion 83 that overhangs the aft recess 92. The center channel 76 provides rigidity to the base plate 70 with a first upstanding wall 96 connecting to a bottom wall 98 which connects to a second upstanding wall 100. The upstanding walls 96, 100 locate the ball mount plate 82. A gooseneck ball 86 is affixed to the ball mount plate 82 located closer to the aft recess 92 than the fore recess 94. Adjacent each corner of the gooseneck frame 22 are mounting tabs 110 that extend perpendicularly from the base plate 70. Each mounting tab 110 has a tab aperture 112 to receive the hitch pin 44 when the mounting tab 110 is located in a corresponding tab aperture 40. Four mounting tabs 110 are spaced on the gooseneck frame 22 and sized to be received by four tab apertures 40. This is shown in FIG. 1.

The gooseneck frame 22 includes fixed rails 120, 122 that are affixed to the base plate 70 and overlay the mounting tabs 110. The fixed frame rails 120, 122 are parallel to each other and equally spaced from the center channel 76 and gooseneck ball 86. The fixed frame rails 120, 122 have two sets of transverse locking apertures, with one set being use apertures 124 and a second set being storage apertures 126. The use apertures 124 are located between the mounting tabs 110 in the longitudinal direction. The fixed rails 120, 122 extend beyond the fore transverse edge 90 with the fore mounting tabs 110 located between the storage apertures 126. The fixed frame rails 120, 122 each have upstanding walls 128, 130 that are joined to a top wall 132 that is parallel to the base plate 70. The use and storage apertures 124, 126 extend through the upstanding walls 128, 130.

Figure 4:
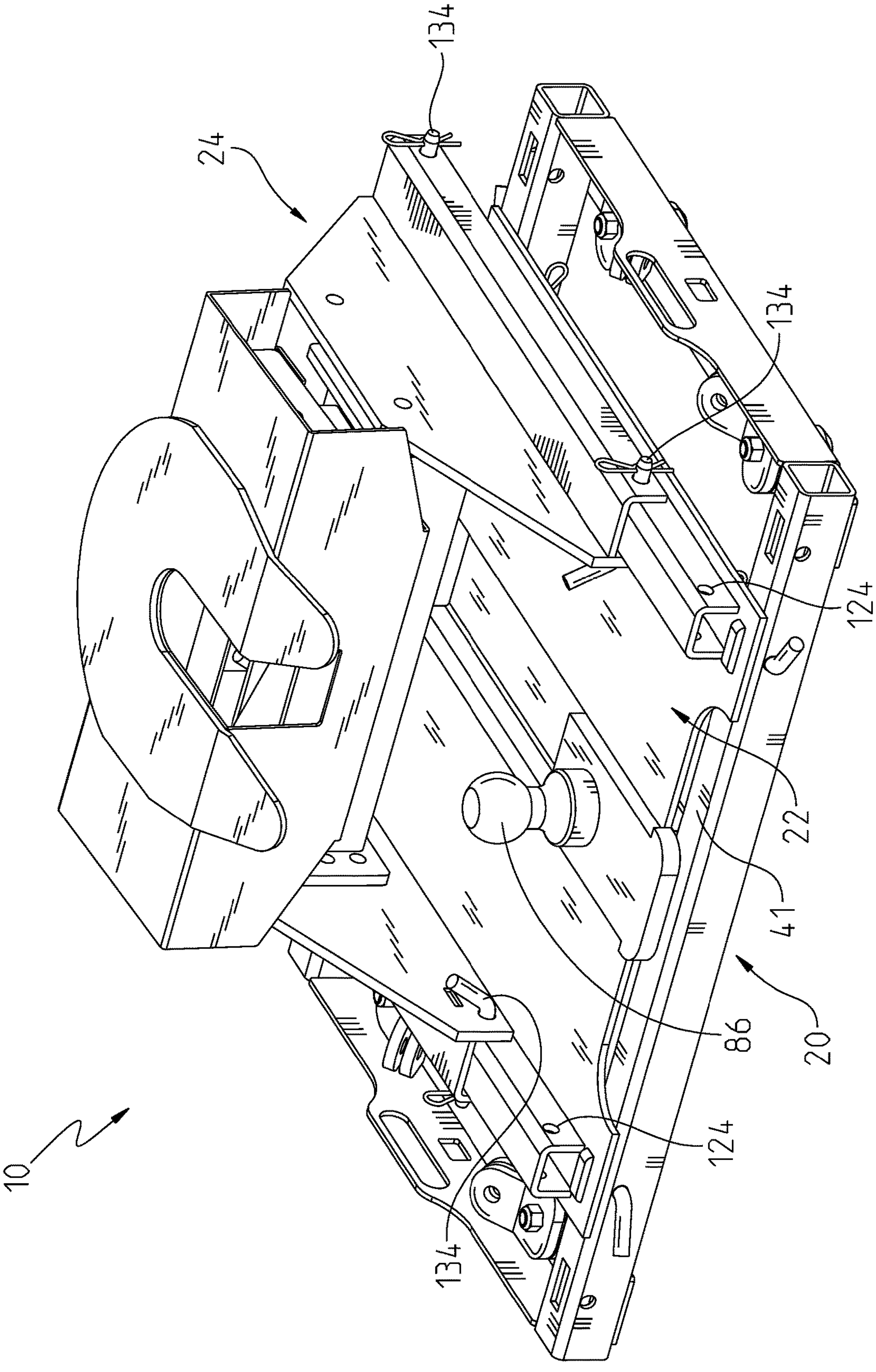
FIG. 4 is a top isometric view of the hitch adapter in FIG. 1 in the gooseneck position.
Figure 5:
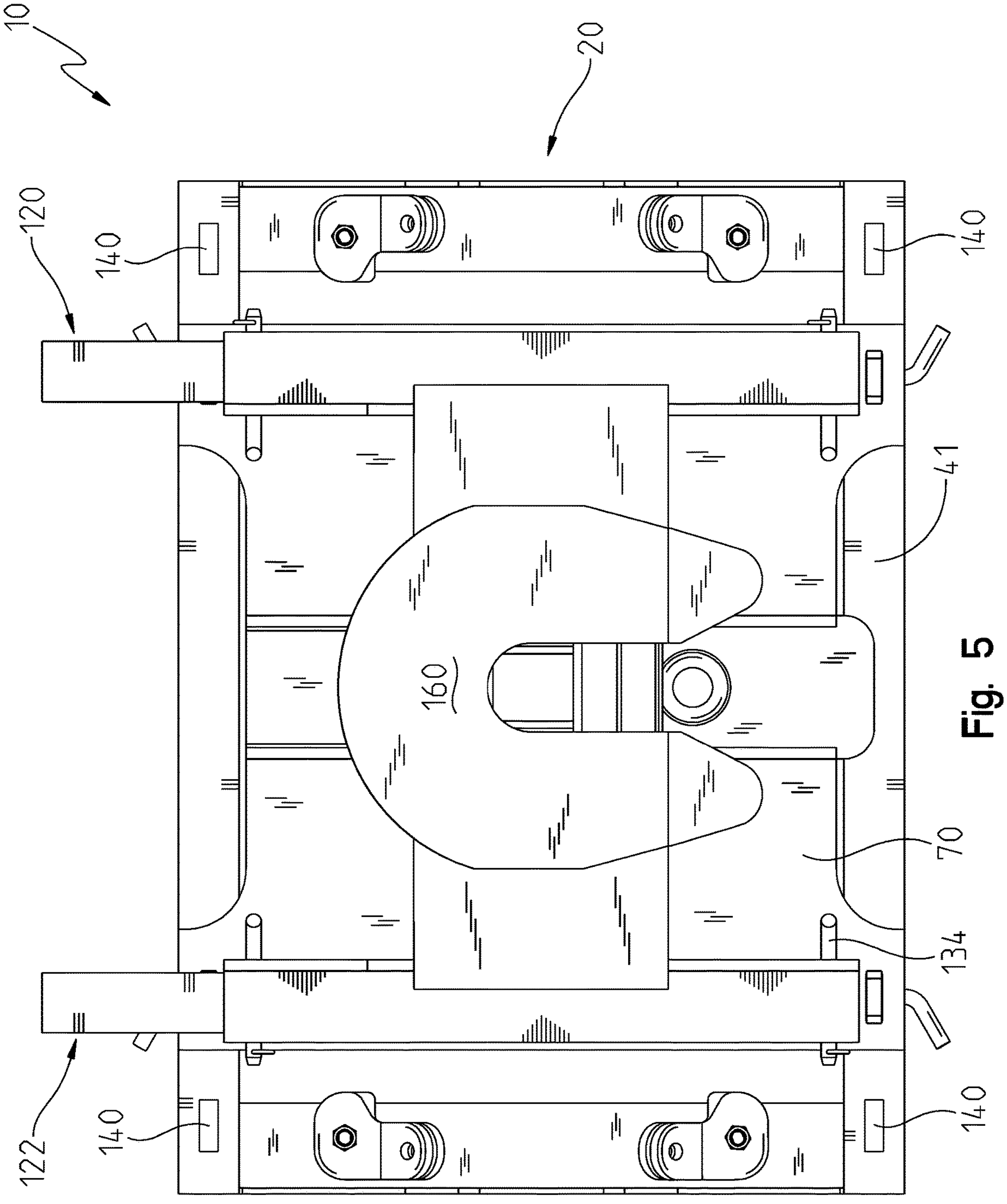
FIG. 5 is a top view of the hitch adapter in FIG. 1 in the fifth wheel position.

The fifth wheel frame 24 attaches to the gooseneck frame 22 with hitch pins 134 and is moveable between a fifth wheel (or use) position shown in FIG. 1 and gooseneck (or stowed) position shown in FIG. 4. As can be seen in these FIGS., the fifth wheel frame 24 is supported by the fixed frame rails 120, 122 and does not couple, mate, or otherwise attach to the gooseneck ball 86. Forces applied to the fifth wheel frame are transferred through the fixed frame rails 120, 122 to the aft rail 30 or 30' and fore rail 32 or 32'. The fifth wheel frame 24 has three main portions, a left side 140, a right side 142, and center 144 that connects the sides 140, 142. The left and right sides 140, 142 are mirror symmetrical, each having a side plate 146, 148 and an "L" shaped rail 150, 152 affixed thereto. The side plates 146, 148 and L-shaped rails 150, 152 cooperate to form moving rails 154, 156. Hitch pin apertures 158 extend through the moving rails 154, 156, shown in FIGS. 2 and 3. The center 144 attaches to the side plates 146, 148 in one of several positions, allowing the user to set the height of the skid plate 160 with respect to the moving rails 154, 156. The center 144 includes a wishbone frame that can pivot to allow for roll movement between the trailer and towing vehicle. The wishbone pivot is attached to the skid plate 160 at a pitch pivot to allow for pitch movement between the trailer and towing vehicle. A kingpin latch is affixed to the skid plate 160 to allow coupling to a trailer having a pinbox with a kingpin (not shown).

Figure 6:
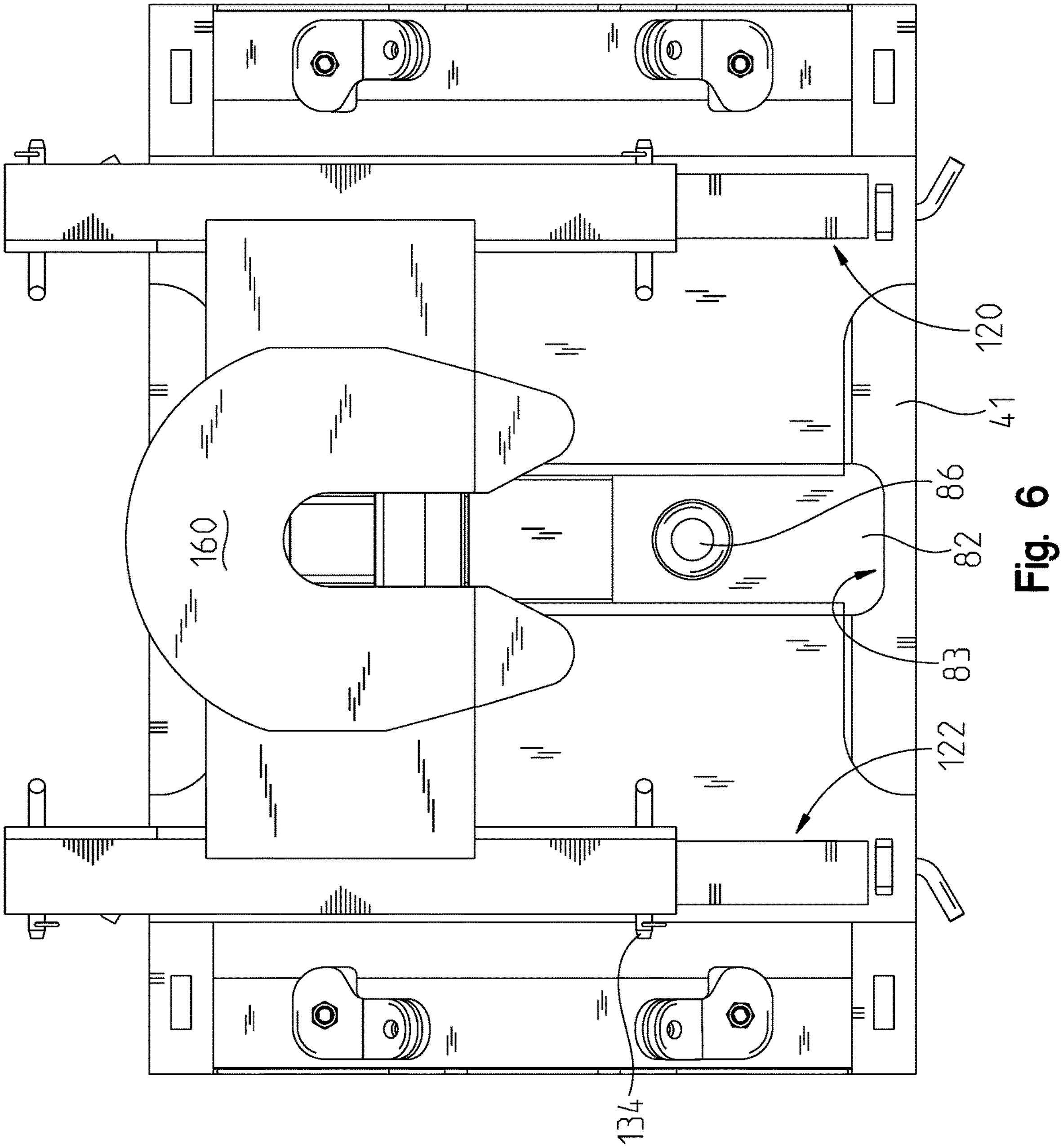
FIG. 6 is a top view of the hitch adapter in FIG. 1 in the gooseneck position.
Figure 7:
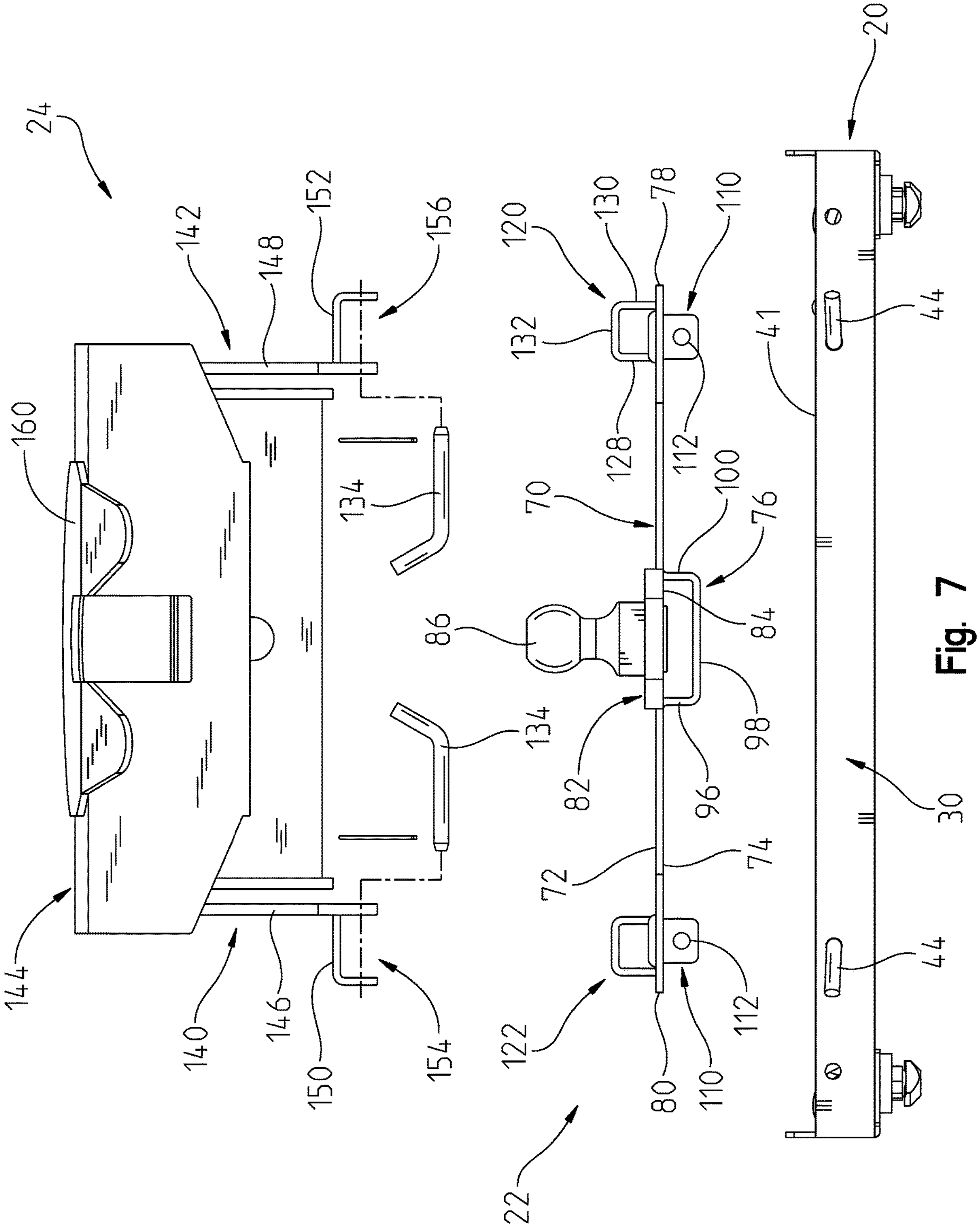
FIG. 7 is a rear exploded view of the hitch adapter in FIG. 2.
Figure 8:
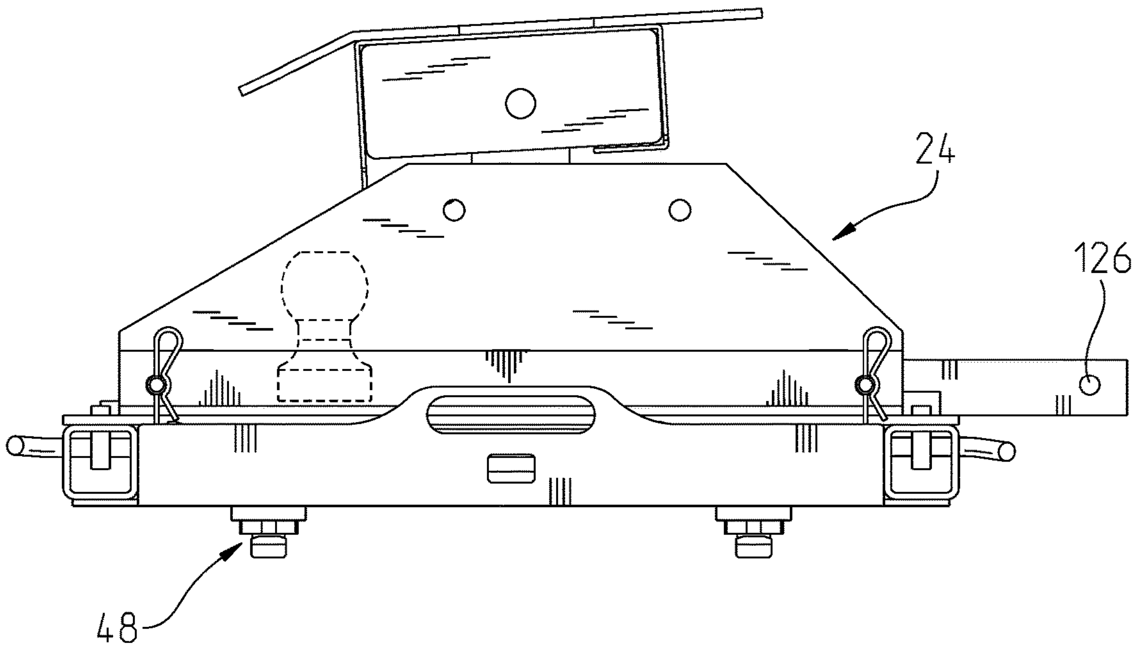
FIG. 8 is a left side view of the hitch adapter in FIG. 5.
Figure 9:
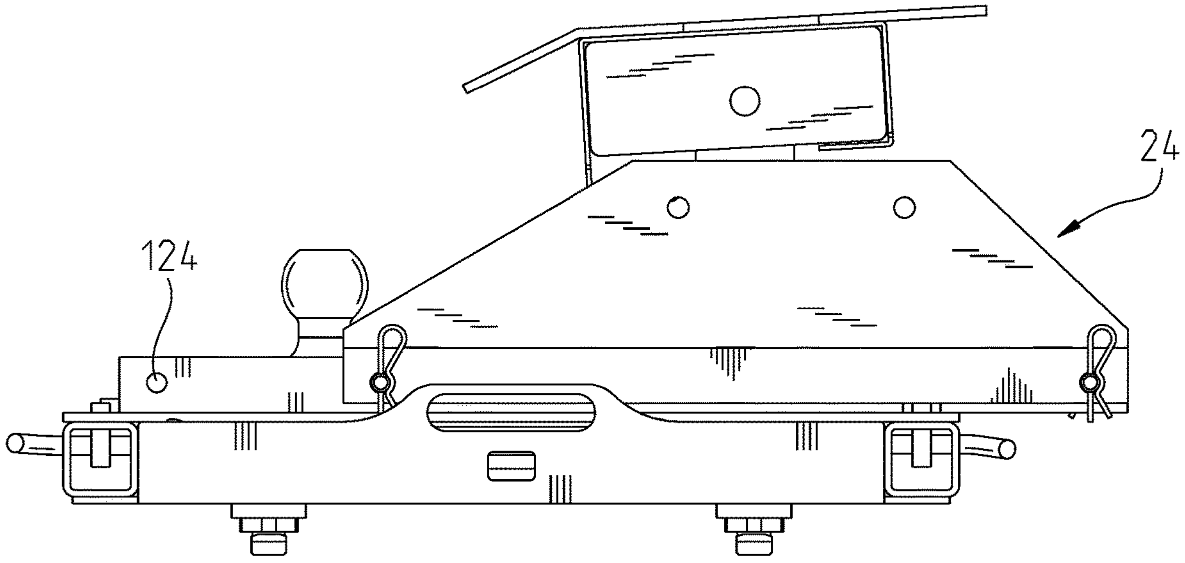
FIG. 9 is a left side view of the hitch adapter in FIG. 6.
Figure 10:
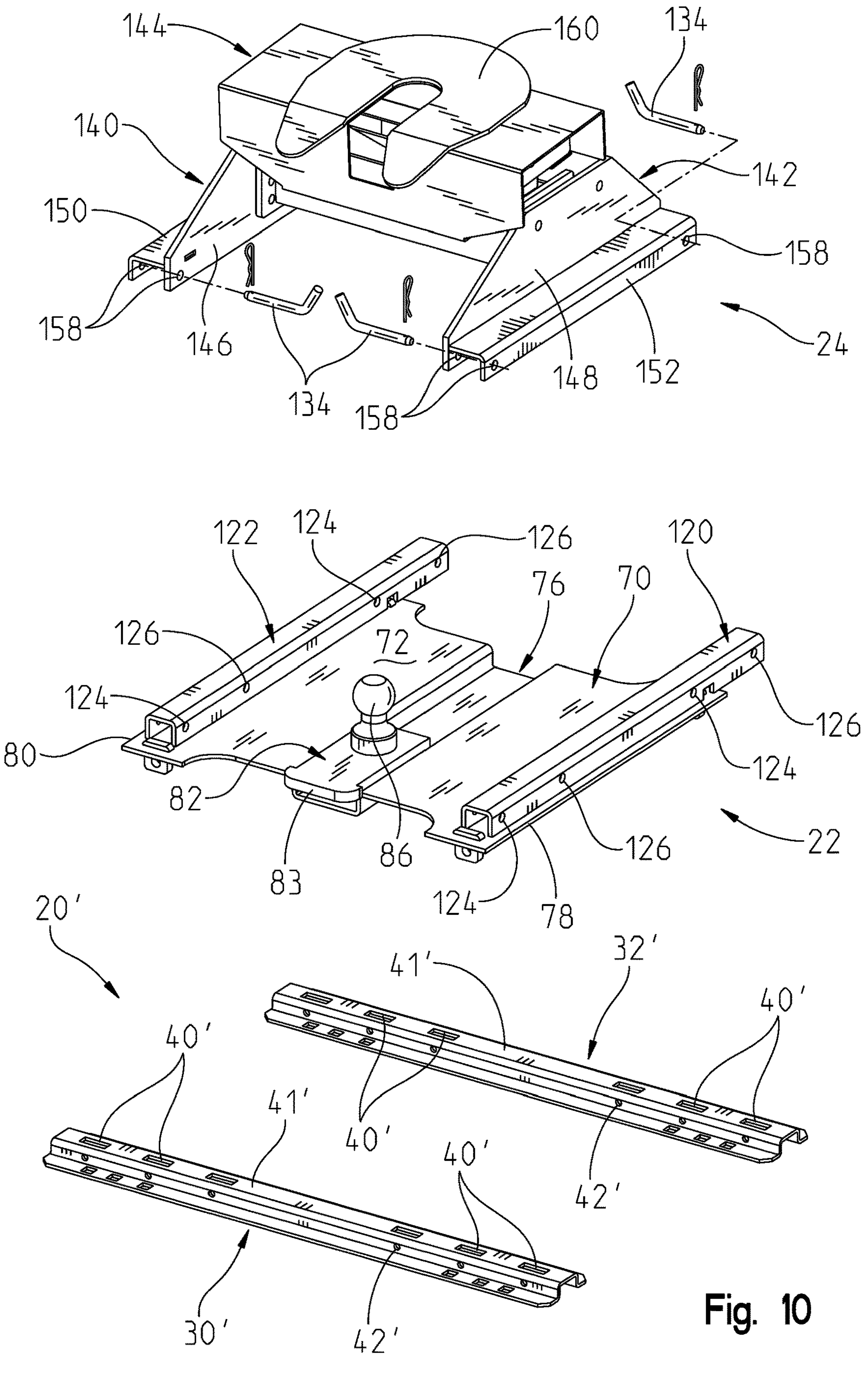
FIG. 10 is a view of the hitch adapter in FIG. 2 with a rail system.

As previously described, the hitch adapter 10 can be used with either a gooseneck or kingpin style of trailer without removing the fifth wheel frame 24 from the towing vehicle. As shown in FIGS. 8 and 9 (or FIGS. 1 and 4), the fifth wheel frame 24 is slidable with respect to the gooseneck frame 22 between a gooseneck position (FIGS. 4 and 9) and a fifth wheel position (FIGS. 1 and 8). When the fifth wheel frame 24 is secured in the gooseneck position, the hitch pins 134 extend through the use apertures 124 and hitch pin apertures 158. The gooseneck position provides unobstructed vertical access to the gooseneck ball 86, as shown in FIG. 6. When a gooseneck trailer (not shown) is coupled to the gooseneck ball 86, the forces applied to the gooseneck ball 86 are transferred through the ball mount plate 82. Because the tongue portion 83 overlays the aft rail 30 and the lower surface 84 is coplanar and in contact with lower surface 74, some of the forces applied to the gooseneck ball 86 are carried by the aft rail 30. In the event that the towing vehicle has existing rails 20' with an aft rail 30' and a fore rail 32' (instead of a puck system), the gooseneck frame 22 is attached directly to the rails 30', 32', where the lower surface 84 is in contact with a top surface 41' of the existing rails 20' and the tabs are received by and affixed within the tab apertures 40' with hitch pins 44 in the lock pin apertures 42'.

To install the hitch adapter 10 to the bed of a towing vehicle equipped with a puck system, the user first installs the puck-to-rail frame 20 by aligning the puck locks 48 with the openings in the bed and lowering the puck-to-rail frame 20 until it fully mates with the openings. The handles 49 are rotated to a locked position and the puck-to-rail frame 20 is now secured to the vehicle. If the vehicle has existing rails 20' affixed to the bed, the puck-to-rail frame 20 is not used. Next, the user aligns the gooseneck frame 22 so the gooseneck ball 86 is closer to the aft rail 30 or aft rail 30' and mounting tabs 110 are aligned with the appropriate tab apertures (40 or 40'). The user then lowers the gooseneck frame 22 so the mounting tabs 110 are received by the tab apertures. Hitch pins 44 are inserted through lock pin apertures (42 or 42') to secure the gooseneck frame 22. Next, the user positions the fifth wheel frame 24 so the moving rails 154, 156 mate with the fixed rails 120, 122. If the user desires to use the gooseneck ball 86, the fifth wheel frame 24 is moved forward so the hitch pin apertures 158 aligns with the storage apertures 126 and the hitch pins 134 are inserted. If the user desires to use the fifth wheel coupler, the fifth wheel frame 24 is moved rearward so the hitch pin apertures 158 aligns with the use apertures 124 and hitch pins 134 are inserted to lock the fifth wheel frame 24 in position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A convertible towing coupler for being affixed to a bed of a towing vehicle, said towing vehicle having fore and aft rails affixed thereto, said coupler comprising:

a puck-to-rail frame having fore and aft rails, said puck-to-rail frame having rotatable locks for mating with pucks located on said towing vehicle, said fore rail affixed to said aft rail through a left side and a right side to form a perimeter, when said puck-to-rail frame is affixed to said vehicle, said fore and aft rails of said puck-to-rail frame are affixed to said vehicle;

a gooseneck frame having a gooseneck ball affixed thereto, said gooseneck frame configured to be affixed to said fore and aft rails and supported thereby at corners of said gooseneck frame, a portion of said gooseneck frame is adjacent said gooseneck ball for contacting said aft rail; and a fifth wheel frame having a kingpin receiver, said fifth wheel frame is mated to said gooseneck frame and moveable between a gooseneck position and a fifth wheel position, said gooseneck position defined by said fifth wheel frame affixed to said gooseneck frame with said kingpin receiver clear of said gooseneck ball, said fifth wheel position defined by said fifth wheel frame affixed to said gooseneck frame with said kingpin receiver obstructing at least a portion of said gooseneck ball.

2. The convertible towing coupler in claim 1, wherein said gooseneck frame having first and second fixed rails affixed thereto, said gooseneck ball is located between said first and second fixed rails, said fifth wheel frame having a first moving rail for mating with said first fixed rail and a second moving rail for mating with said second fixed rail, said moving rails slidable with respect to said fixed rails.

3. The convertible towing coupler in claim 2, said fixed and moving rails having apertures for affixing said fifth wheel frame in said gooseneck position or said fifth wheel position.

4. The convertible towing coupler in claim 3, wherein said gooseneck frame having tabs extending perpendicularly from a lower surface, said fixed rails overlaying said tabs.

5. The convertible towing coupler in claim 1, wherein said gooseneck ball is only mateable to a trailer when said fifth wheel frame is in said gooseneck position.

6. The convertible towing coupler of claim 1, wherein said kingpin receiver is mateable to a trailer when said fifth wheel frame is in said fifth wheel position.

7. The convertible towing coupler in claim 1, wherein said gooseneck frame has a base plate, said gooseneck ball is affixed to said base plate.

8. The convertible towing coupler in claim 7, wherein said base plate has a center channel and an aft transverse edge, a portion of said aft transverse edge is a recessed edge extending across said center channel, a gooseneck plate overhangs said recessed edge and has a lower surface coplanar with a bottom surface of said base plate.

9. The convertible towing coupler in claim 1, said gooseneck frame having tabs extending perpendicularly from a lower surface, said fore and aft rails having tab apertures for receiving and affixing said tabs to affix said gooseneck frame to said fore and aft rails.

10. A convertible towing coupler for being affixed to a bed of a towing vehicle having a fore and aft rail affixed thereto, said coupler comprising:

a gooseneck frame for being affixed to said fore and aft rails, said gooseneck frame having tabs extending perpendicularly from a lower surface, a gooseneck plate affixed to said gooseneck frame and having a lower surface that is coplanar with said lower surface of said gooseneck frame, a gooseneck ball is affixed to said gooseneck plate, said gooseneck frame having a first fixed rail and a second fixed rail affixed thereto, said gooseneck ball is located between said first and second fixed rails;

a fifth wheel frame having a first moving rail and a second moving rail affixed thereto, said first and second moving rails spaced apart from each other by a distance equal to a distance between said first and second fixed rails, said fifth wheel frame having a kingpin receiver located between said first and second moving rails; and said fifth wheel frame moveable between a fifth wheel position and a gooseneck position, said fifth wheel position defined by said fifth wheel frame affixed to said gooseneck frame with said kingpin receiver obstructing at least a portion of said gooseneck ball, said gooseneck position defined by said fifth wheel frame affixed to said gooseneck frame with said kingpin receiver clear of said gooseneck ball.

11. The convertible towing coupler in claim 10, wherein said gooseneck frame having a base plate with a center channel, said gooseneck plate affixed to said center channel.

12. The convertible towing coupler in claim 10, wherein a portion of said gooseneck plate is configured to contact said aft rail.

13. The convertible towing coupler in claim 10, wherein said fore and aft rails are affixed to a puck-to-rail frame, said puck-to-rail frame having rotatable locks for mating with pucks located on said towing vehicle, said fore rail affixed to said aft rail with a left side and a right side to form a perimeter, when said puck-to-rail frame is affixed to said vehicle, said fore and aft rails of said puck-to-rail frame are affixed to said vehicle.

14. The convertible towing coupler in claim 10, wherein said fixed rails are spaced apart by a distance equal to said tabs.

15. A convertible towing coupler comprising:

a gooseneck frame having a base plate with a center channel, said gooseneck frame having tabs extending therefrom, a gooseneck plate affixed to said base plate and located in said center channel, a gooseneck ball is affixed to said gooseneck plate, said gooseneck frame having a first fixed rail and a second fixed rail affixed thereto, said gooseneck ball is located between said first and second fixed rails;

a fifth wheel frame having a first moving rail and a second moving rail affixed thereto, said first and second moving rails spaced apart to slidably mate with said first and second fixed rails, said fifth wheel frame having a kingpin receiver located between said first and second moving rails; and said fifth wheel frame moveable between a fifth wheel position and a gooseneck position, said fifth wheel position defined by said fifth wheel frame affixed to said gooseneck frame with said kingpin receiver obstructing said gooseneck ball, said gooseneck position defined by said fifth wheel frame affixed to said gooseneck frame with said kingpin receiver clear of said gooseneck ball.

16. The convertible towing coupler in claim 15, further comprising a puck-to-rail frame having an aft rail connected to a fore rail by a left side and a right side to form a perimeter, said left and right sides having rotatable locks for mating with vehicle-mounted receivers, said fore and aft rails each having tab apertures to receive said tabs on said gooseneck frame.

17. The convertible towing coupler in claim 15, wherein said first and second fixed rails extending beyond a transverse edge on said base plate.

18. The convertible towing coupler in claim 15, wherein said base plate has an aft transverse edge, a portion of said aft transverse edge is a recessed edge extending across said center channel, said gooseneck plate overhanging said recessed edge and having a lower surface coplanar with a bottom surface of said base plate.

19. The convertible towing coupler in claim 15, wherein said base plate has a fore transverse edge and an aft transverse edge, said gooseneck ball is located closer to said aft transverse edge than said fore transverse edge.

* * * * *